United States Patent
Lee

(10) Patent No.: US 7,689,841 B2
(45) Date of Patent: Mar. 30, 2010

(54) USB CIRCUIT DEVICE FOR PREVENTING REVERSE CURRENT FROM EXTERNAL DEVICE

(75) Inventor: Cheol-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 11/580,932

(22) Filed: Oct. 16, 2006

(65) Prior Publication Data

US 2007/0088964 A1 Apr. 19, 2007

(30) Foreign Application Priority Data

Oct. 17, 2005 (KR) .................. 10-2005-0097368

(51) Int. Cl.
*G06F 13/14* (2006.01)
(52) U.S. Cl. .................. 713/300; 307/44; 307/52; 320/134; 320/138; 713/340
(58) Field of Classification Search .................. 713/300, 713/340; 307/44, 52; 320/134, 138
See application file for complete search history.

(56) References Cited

U.S. PATENT DOCUMENTS

| | | | |
|---|---|---|---|
| 6,510,485 B1 | 1/2003 | Shin | |
| 7,329,969 B2 * | 2/2008 | Niinuma | 307/130 |
| 2003/0107566 A1 * | 6/2003 | Shin et al. | 345/212 |
| 2003/0158990 A1 * | 8/2003 | Allen et al. | 710/305 |

FOREIGN PATENT DOCUMENTS

| | | |
|---|---|---|
| JP | 11-85291 | 3/1999 |
| KR | 1999-43398 | 6/1999 |
| KR | 2002-54772 A | 7/2002 |
| KR | 2003-60431 A | 7/2003 |

OTHER PUBLICATIONS

English Abstract for Korean Patent No. 100261846, Apr. 24, 2000.
Certificate of Patent No. ZL200610171851 issued in the corresponding Chinese application by the Chinese Intellectual Property Office on Aug. 19, 2009 (including the Chinese application CN 100530876C).

* cited by examiner

*Primary Examiner*—Abdelmoniem Elamin
(74) *Attorney, Agent, or Firm*—Jefferson IP Law, LLP

(57) ABSTRACT

A USB circuit device prevents reverse current while complying with USB specifications. A USB circuit device includes a connector unit to which a USB device is connected; a power supplying unit supplying power with the USB device through the connector unit; a switching unit flowing current induced into the connector unit from the USB device, into a ground selectively; and a controller controlling the switching unit to flow the current induced into the connector unit, into the ground if a level of the power provided with the USB device by the power supplying unit is less than a predetermined value. Accordingly, there is provided a USB circuit device for preventing reverse current from an external device and capable of protecting the circuit from over current with satisfaction to a USB specification.

12 Claims, 7 Drawing Sheets

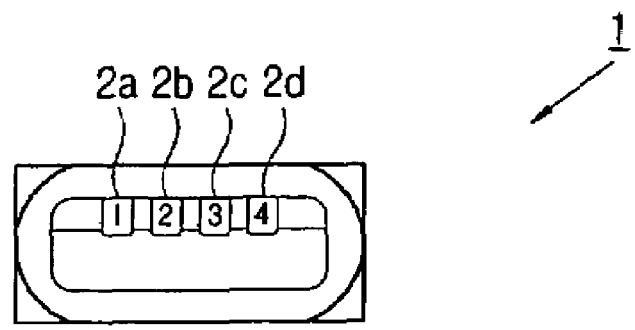
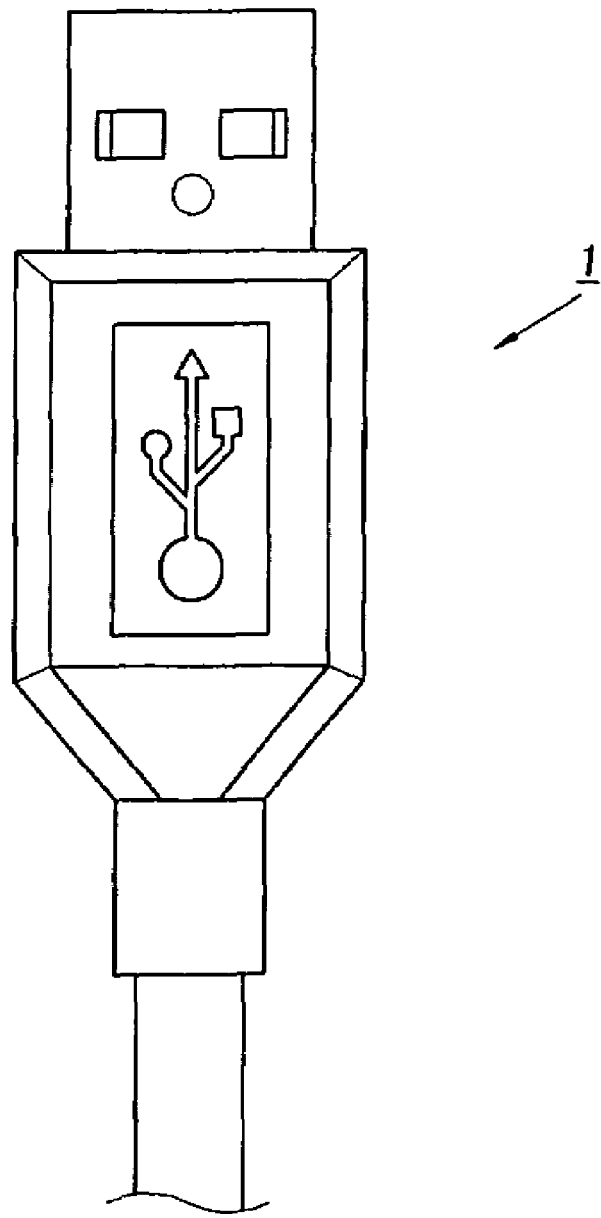
FIG. 1A
FIG. 1B

USB CIRCUIT DEVICE FOR PREVENTING REVERSE CURRENT FROM EXTERNAL DEVICE

CROSS-REFERENCE TO RELATED APPLICATION

This application claims the benefit of Korean Application No. 2005-97368, filed Oct. 17, 2005 in the Korean Intellectual Property Office, the disclosure of which is incorporated herein by reference.

BACKGROUND OF THE INVENTION

1. Field of the Invention

Aspects of the present invention relate to a USB circuit device, and more particularly, to a USB circuit device that prevents reverse current and that is in compliance with USB specifications.

2. Description of the Related Art

A universal serial bus (USB) interface is a general-purpose tool that connects a personal computer (PC) with an external device. The USB interface has an additional power signal that provides power to the external device if the device does not have its own power source. However, when an external device that has its own power source is connected to the PC, if the power of the external device is not shut off when the power of the PC is shut off, a reverse current may be induced from the external device to the PC. The reverse current influences the operation of the PC and causes problems.

SUMMARY OF THE INVENTION

Accordingly, it is an aspect of the present invention to provide a USB circuit device that prevents reverse current from an external device and that is capable of protecting the circuit from over current while complying with USB specifications.

Additional aspects an/or advantages of the invention will be set forth in part in the description which follows and, in part, will be obvious from the description, or may be learned by practice of the invention.

According to an aspect of the present invention, there is provided a USB circuit device comprising: a connector unit to which a USB device is connected; a power supplying unit that supplies power to the USB device through the connector unit; a switching unit that selectively flows current induced into the connector unit from the USB device to a ground; and a controller that controls the switching unit to flow the current induced into the connector unit to the ground if a level of the power provided with the USB device by the power supplying unit is less than a predetermined value.

According to another aspect of the present invention, the USB circuit device further comprises at least one internal device receiving the power, wherein the controller determines that the level of the power provided to the USB device is less than the predetermined values if the internal device is in a state of shutting off the power.

According to another aspect of the present invention, the USB circuit device is in a S5 state based on the Advanced Configuration and power Interface (ACPI) specification if the internal device is in a state of shutting off the power.

According to another aspect of the present invention, the power supplying unit outputs a 5V normal power in an S0 state and a 5V standby power in an S3 state.

According to another aspect of the present invention, the switching unit comprises a FET including a drain connected to an output terminal of the power supplying unit, a source connected to the ground, and a gate connected to the controller.

According to another aspect of the present invention, the USB circuit device further comprises an over current shutting unit that shuts off the flow of the current induced into the connector unit from the USB device if the current induced into the connector unit from the USB device is more than a predetermined value.

BRIEF DESCRIPTION OF THE DRAWINGS

These and/or other aspects and advantages of invention will become apparent and more readily appreciated from the following description of the embodiments, taken in conjunction with the accompanying drawings of which:

FIGS. 1A and 1B are a front view and a plane view, respectively, illustrating a USB standard connector;

DETAILED DESCRIPTION OF THE EMBODIMENTS

Figure 2:
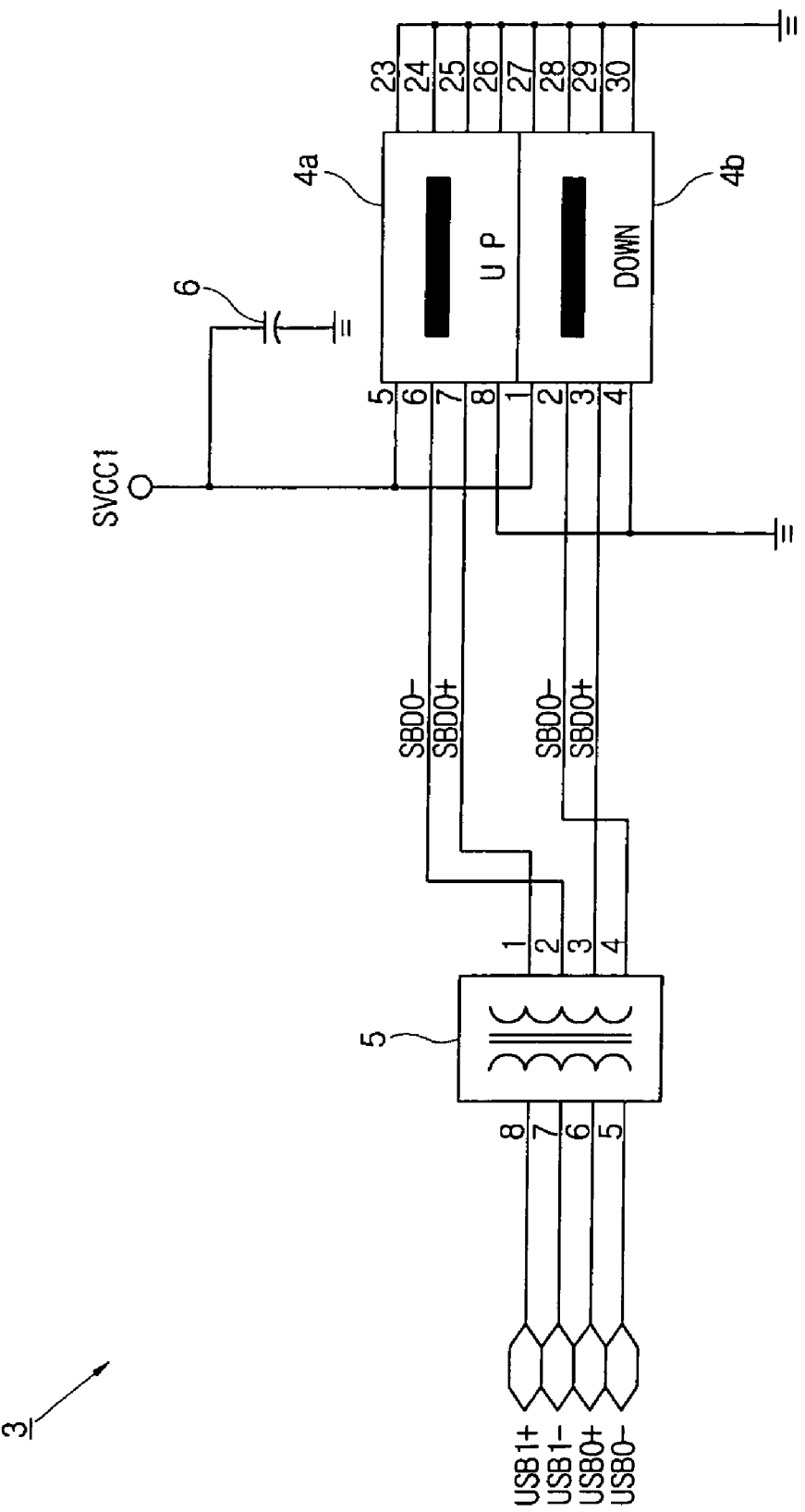
FIG. 2 is a circuit diagram illustrating a 2 port USB circuit according to the USB standard.

Reference will now be made in detail to embodiments of the present invention, examples of which are illustrated in the accompanying drawings, wherein like reference numerals refer to the like elements throughout. The embodiments are described below in order to explain aspects of the present invention by referring to the figures.

FIGS. 1A and 1B are a front view and plane view, respectively, illustrating a USB standard connector 1. In the USB interface, the USB standard connector 1 has 4 signal lines as shown in FIG. 1A. The use of each signal line is described in TABLE 1 as follows.

TABLE 1

| pin number | signal name | contents |
|---|---|---|
| 1 | VBUS | Power signal for supplying power to a device that does not have its own power source. In general, power is supplied in the S0 and S3 states, and power is not supplied in the S5 state. |
| 2 | D− | Negative signal among differential signals for transmitting data. |
| 3 | D+ | Positive signal among differential signals for transmitting data. |
| 4 | GND | Ground signal. |

Here, S0, S3 and S5 describe the state of power in the PC to which the USB interface is connected. The designations refer to a normal state, a stand-by state and a soft-off state, respectively. As described in TABLE 1, the USB interface has D+ and D−signals that transmit data and a VBUS signal that transmits power.

Figure 3:
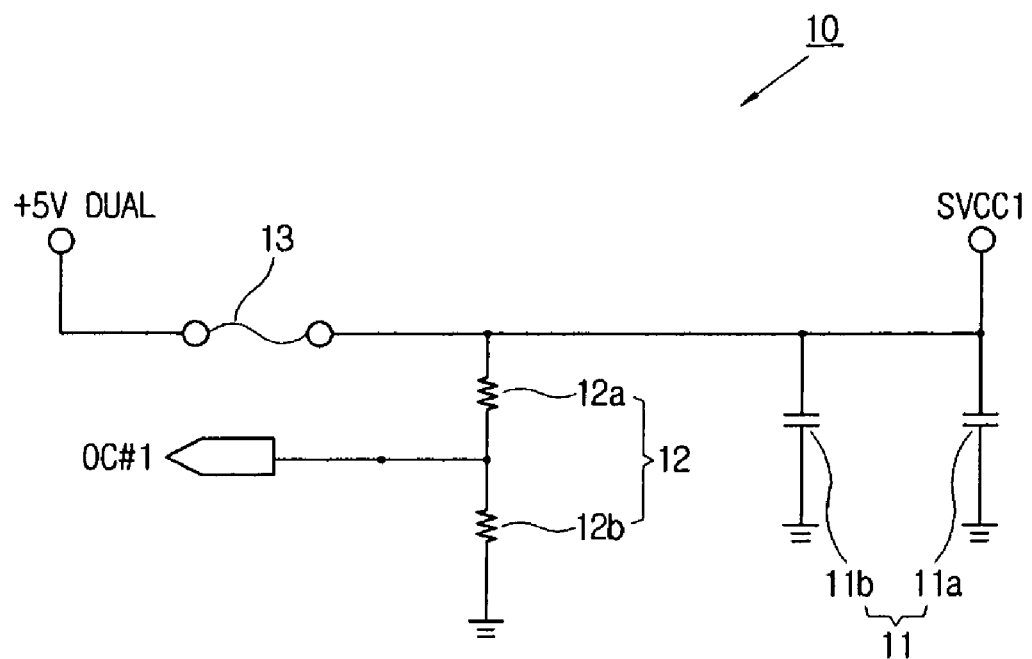
FIG. 3 is a circuit diagram illustrating a USB power source circuit according to the USB standard.
Figure 4:
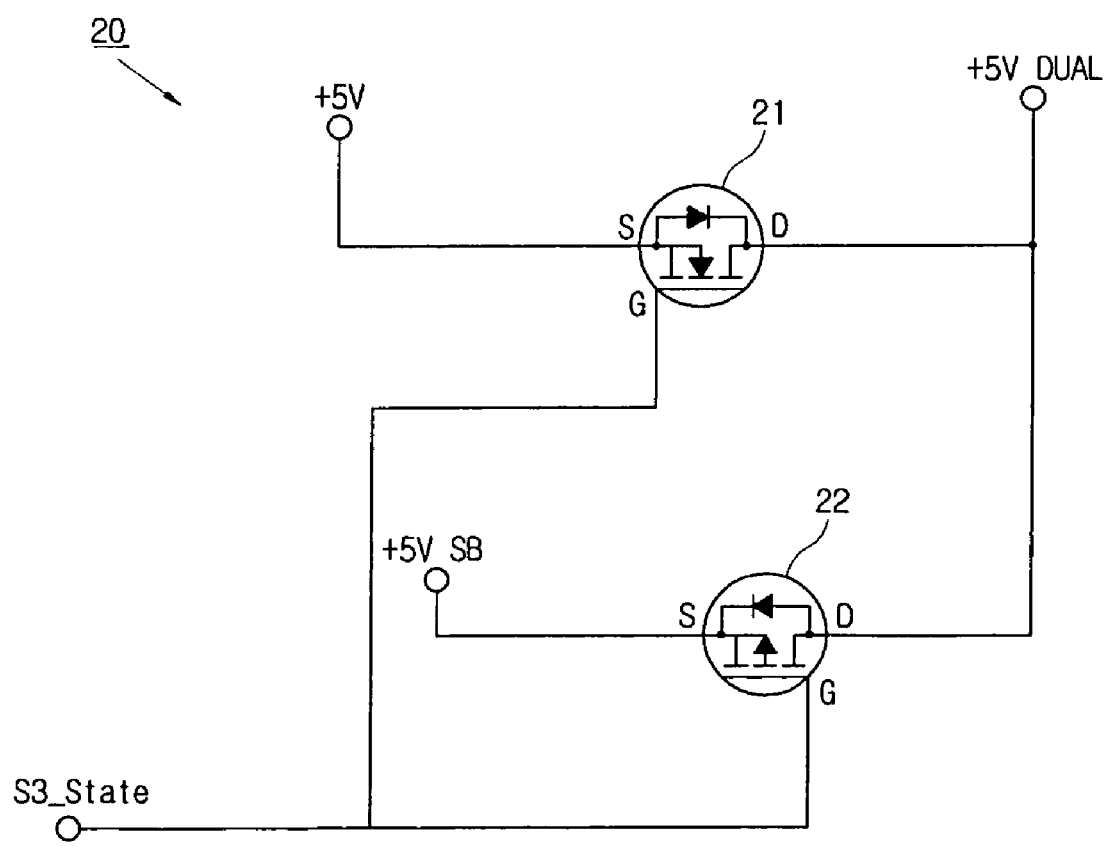
FIG. 4 is a circuit diagram illustrating a 5V dual USB power source generating circuit according to the USB standard.

FIG. 2 is a circuit diagram illustrating a 2 port USB circuit 3 according to the USB standard, FIG. 3 is a circuit diagram illustrating a USB power source circuit 10 according to the USB standard and FIG. 4 is a circuit diagram illustrating a 5V dual USB power source generating circuit 20 according to the USB standard. As shown in FIG. 2 through FIG. 4, when the USB interface is provided in a PC main board (not shown), the PC main board may comprise the 2 port USB circuit 3 having connectors 4a and 4b for connecting with an external device, a USB power source circuit 10 for providing the VBUS and a 5V dual USB power source generating circuit 20 for controlling the VBUS.

The 2 port USB circuit 3 comprises D+ and D−signal providing units USB1+, USB1−, USB0+ and USB0− for transmitting data from each port 4a and 4b and a common mode choke 5 preventing electromagnetic interference EMI. The VBUS (SVCC1) and a ground (GND) are used at the ports 4a and 4b in common.

Referring to FIG. 3, the USB power source circuit 10 comprises a decoupling capacitor 11 that decreases the EMI and voltage droop, an over current protection circuit 12 that prevents an over current and a fuse 13 that protects the circuit when a short circuit occurs.

Referring to FIG. 4, the 5V dual USB power source generating circuit 20 that generates and controls the VBUS comprises 2 field effect transistors (FETs) 21 and 22, each being a different type. A signal indicating a S3 state (designated as "S3_State" in FIG. 4) among the states of power in the PC to which the external device is connected is inputted to each gate of the FETs 21 and 22. The 5V dual USB power source generating circuit 20 outputs 5V normal power (designated as "+5V" in FIG. 4) in an S0 state and 5V stand-by power (designated as "+5V SB" in FIG. 4) in an S3 state as 5V dual USB power and does not output the power source in an S5 state. Here, the 5V normal power source "+5V" is activated only in the S0 state and the 5V stand-by power source "+5V SB" is always activated regardless of the S0, S3 and S5 states. An operation of the 5V dual USB power source generating circuit 20 is described in TABLE 2 as follows.

TABLE 2

| The state of power in the PC | S3_state # | FET(21) | FET(22) | the selected power | output level of +5 V_dual |
|---|---|---|---|---|---|
| S0 | 1 | turn-on | turn-off | +5 V | +5 V |
| S3 | 0 | turn-off | turn-on | +5 V_SB | +5 V |
| S5 | 1 | turn-on | turn-off | +5 V | 0 |

Factors such as voltage drop, voltage droop, short circuits of the circuit, overcurrent protecting circuits and the like should be considered when a USB power source circuit is designed.

To provide stable power to an external device that does not have its own power source, the voltage drop should provide a minimum of 4.75V or more per max load (the USB specification according to USB Implementers Forum (USBIF) identifies 500 mA per port as the max load). To satisfy the USB specification, the inner resistance of fuses, beads, conducting wires and the like in the main board of the PC is minimized such that a voltage drop of 100 mV or more does not occur.

In case of the 2 port USB circuit 3 as shown in FIG. 2, a load of 1A at maximum value may be connected to the ports because the 2 ports 4a and 4b are common to one power source (VBUS). Also, the fuse (and/or a conducting wire) may have less than 0.1 Ohms of resistance to satisfy the requirement of a voltage drop of less than 100 mV. In other words, a fuse having much less resistance should be used and the thickness of the conducting wire should be designed to satisfy the USB specification as much as possible.

A voltage droop results from a power source noise component induced by inductance when the USB device is detached from an adjacent port. If the design about the voltage droop is unstable, an operation of the adjacent port may be influenced by the unstable design when the USB device is detached from the adjacent port. A design of a proper decoupling capacitor such as a capacitor 6 of the 2 port USB circuit 3 as shown in FIG. 2 is needed so as to prevent the voltage droop problem.

If a VBUS terminal and a GND terminal are short-circuited by an external factor, the USB standard is designed to prevent the PC from breaking down due to the over current and to protect the circuit against the short circuit and the over current. In the USB power source circuit 10 shown in FIG. 3, a decoupling capacitor 11 shuts off an alternating current component as noise, and the fuse 13 has the property that impedance is increased while an over current occurs. Accordingly, the fuse 13 shuts off the current by using the property of the increased impedance.

Alternatively or additionally, the USB power source circuit 10 may include an over current protection circuit 12 that comprises two resistors 12a and 12b. A signal indicating a voltage of a connection point between the two resistors 12a and 12b (that is, an over current detection signal OC#1) is connected to an over current control means (not shown) of the PC. If an output terminal SVCC1 is short-circuited from the ground, the voltage of the connection point between the two resistors 12a and 12b is decreased. Accordingly, if the over current control means of the PC evaluates a level of the voltage based on the over current detection signal OC#1 and determines that the evaluated voltage is less than a predetermined value indicating the over current, the over current control means informs a USB controller (not shown) controlling the USB interface on the whole of the occurrence of the over current to execute an operation of shutting off the power supply to the external device and the like.

Figure 5:
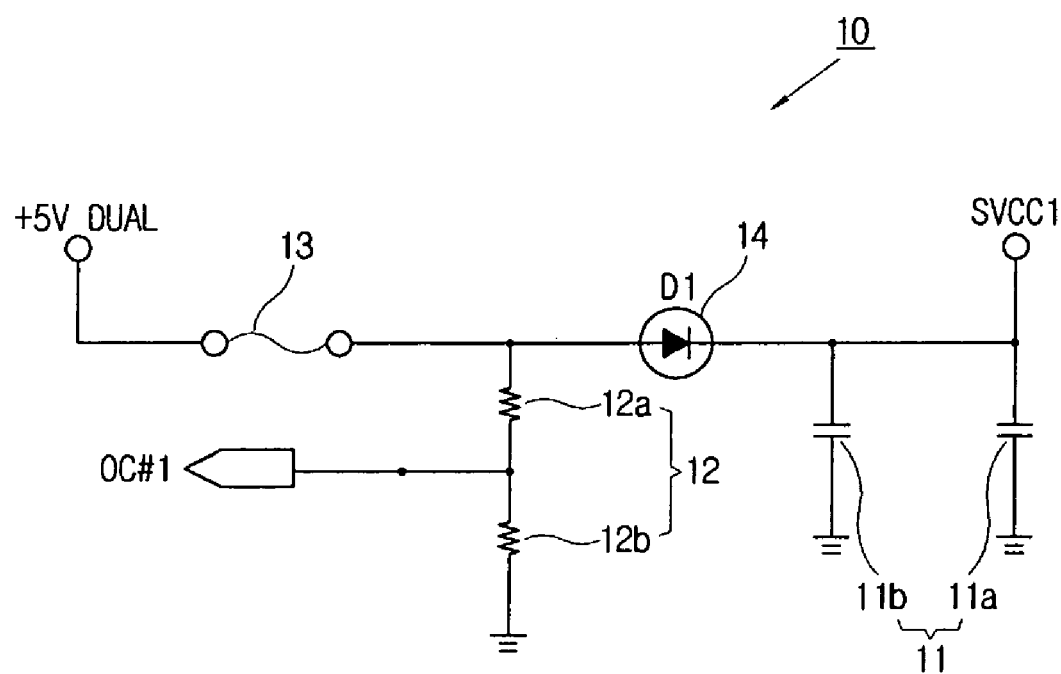
FIG. 5 is a circuit diagram adding a diode for preventing a reverse current in the USB power source circuit shown in FIG. 3.

However, when an external device that has its own power source is connected to a PC having a USB circuit, if the power of the PC is shut and the state of power is an S5 state, and if the power source of the external device is not shut off, a reverse current from the external device may be induced to a power supplying terminal of the USB power source circuit due to the low potential of the PC, so that a malfunction of the PC may be caused. Furthermore, when a reverse current is induced to the 5V dual power source circuit in the S5 state, it causes a malfunction of the PC, and a continued supply of the reverse current affects circuit elements within the PC. The durability of the circuit elements may be decreased because the 5V dual power source is used for not only the USB circuit but also for the other circuit. To solve this problem, a diode for a general reverse current prevention circuit may be used. FIG. 5 is a circuit diagram showing the diode 14 added to the USB power source circuit 10 shown in FIG. 3 for preventing the reverse current.

However, in such a case, since the forward voltage loss of a conventional diode is a minimum of 0.2V or more, a voltage drop is generated in both terminals of the diode 14 when the state of power in the PC is S0 or S3. Accordingly, the USB power source circuit 10 shown in FIG. 5 does not comply with the voltage drop requirements (minimum 4.75V or more) in the USB specification due to the voltage loss of the diode 14.

To satisfy the voltage drop condition in the USB specification, the voltage loss by the PC component should not be 0.1V or greater.

Figure 6:
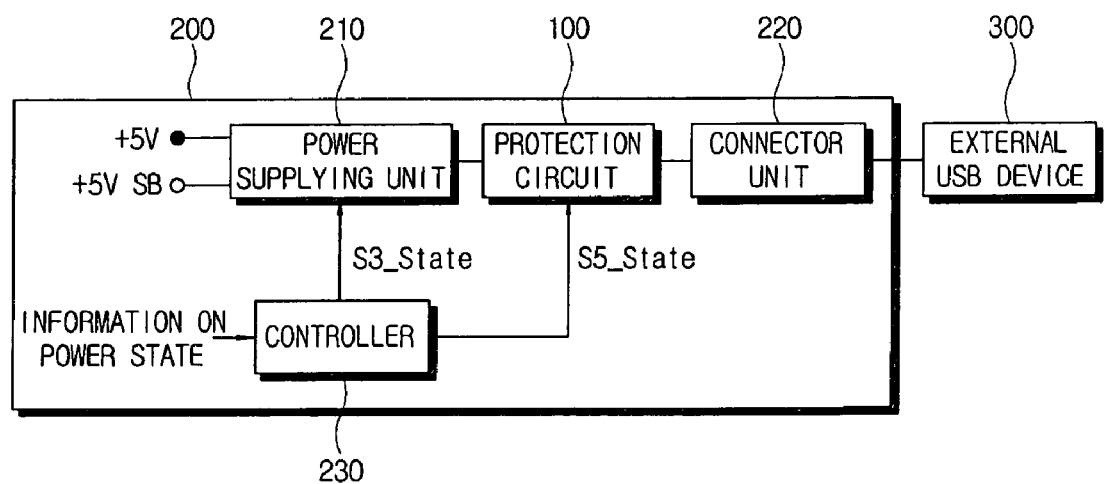
FIG. 6 is a block diagram illustrating a configuration of a USB circuit device according to an embodiment of the present invention.

FIG. 6 is a block diagram illustrating a configuration of a USB circuit device 200 according to an embodiment of the present invention. An external USB device 300 according to the USB specification is connected to the USB circuit device 200. The USB circuit device 200 interchanges data with the external USB device 300 and supplies power to the external USB device 300 according to the USB specification. The USB circuit device 200 may be any computer system that can communicate with a USB device such as, for example, a PC or the like. Further, the USB device 300 can be any peripheral device connectable to the device 200.

As shown in FIG. 6, the USB circuit device 200 comprises a power supplying unit 210, a protection circuit 100, a connector unit 220 and a controller 230. The connector unit 220 provides a physical and electrical connection between the USB circuit device 200 and the external USB device 300. While not limited thereto, the external USB device 300 may comprise a connector 1 as shown in FIGS. 1A and 1B, for example. While not limited thereto, the connector unit 220 may comprise a 2 port USB circuit 3 as shown in FIG. 2 for example. In this case, the connector 1 of the external USB device 300 may be connected to one of the 2 ports 4a and 4b of the 2 port USB circuit 3. While not limited thereto, the USB circuit device 200 may further comprise a USB controller (not shown) to transmit data to the external USB device 300 through the connector unit 220.

The power supplying unit 210 supplies power to the external USB device 300 connected through the connector unit 220. While not limited thereto, the power supplying unit 210 may comprise a 5V dual USB power source generating circuit 20 as shown in FIG. 4 for example.

The controller 230 controls the power supplying unit 210 to provide the proper power to the external USB device 300. While not required, the USB circuit device 200 according to an embodiment may be included in a computer system which comprises internal devices such as a mouse, a keyboard, an input and output unit such as a display, storage units such as a RAM, ROM and hard disc and a CPU. The controller 230 collects information (hereinbelow, referring to "information of the state of power") about an operation of the aforementioned internal devices and selects one of the plurality of the states of power based on the collected information of the power states to provide power corresponding to the selected state to each internal device. The plurality of the states of power according to an embodiment comprises the aforementioned S0, S3 and S5 states based on the Advanced Configuration and Power Interface (ACPI) specification, but may comprise additional states in other aspects.

When the power supplying unit 210 includes the 5V dual USB power source generating circuit 20 of FIG. 4, the controller 230 transfers a signal indicating the S3 state (designated as "S3_State" in FIGS. 4 and 6) to the 5V dual USB power source generating circuit 20. The controller 230 controls the 5V dual USB power source generating circuit 20 to output the 5V normal power (designated as "+5V" in FIGS. 4 and 6) in the S0 state, and the 5V stand-by power (designated as "+5V SB" in FIGS. 4 and 6) in the S3 state as 5V dual USB power (designated as "+5V dual" in FIGS. 4 and 7). Also, the controller 230 controls the 5V dual USB power source generating circuit 20 such that the power source is not output in the S5 state.

When power is supplied by the external USB device 300, the protection circuit 100 protects the circuit from short circuits and over currents. Particularly, if a reverse over current is induced into the USB circuit device 200 from the external USB device 300, the protection circuit 100 protects the USB circuit device 200.

Figure 7:
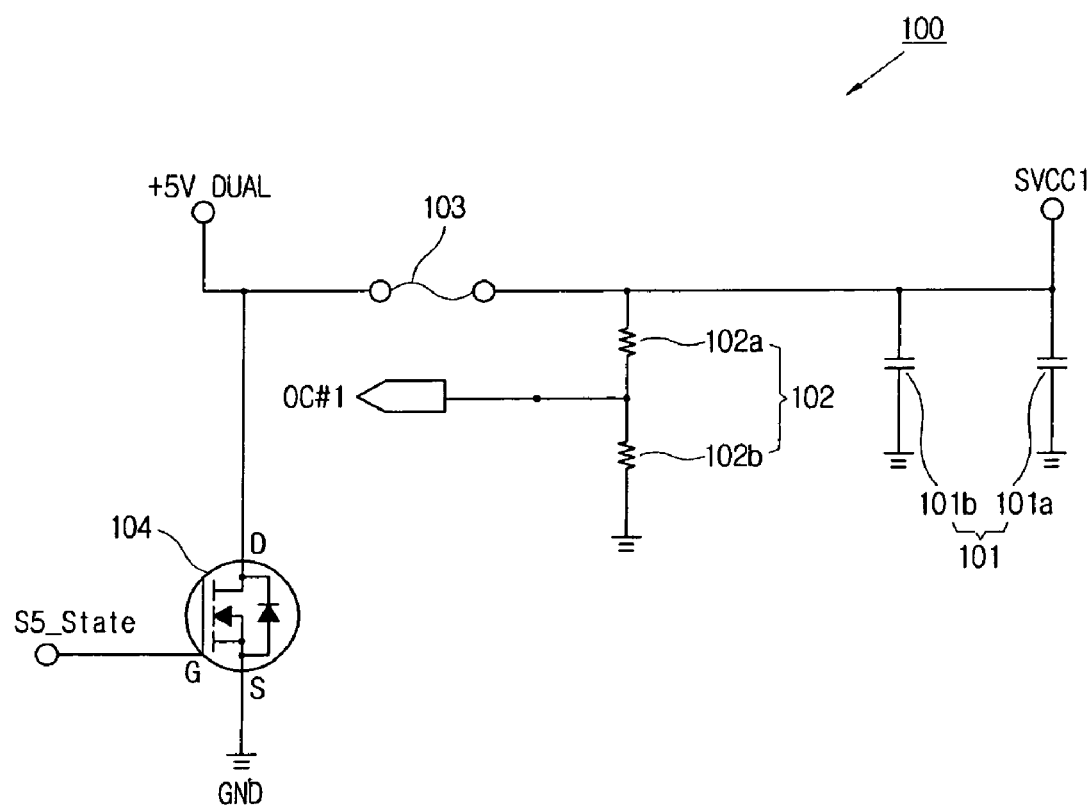
FIG. 7 is a circuit diagram illustrating a configuration of the protection circuit according to an embodiment of the present invention.

FIG. 7 is a circuit diagram illustrating a configuration of the protection circuit 100 according to an embodiment of the present invention. The protection circuit 100 comprises an over current protection circuit 102 having 2 resistors 102a and 102b. A signal indicating the voltage of the connection point between the 2 resistors 102a and 102b, that is, an over current detection signal OC#1 is transferred to the controller 230.

If the output terminal SVCC1 is short-circuited from the ground GND, the voltage of the connection point between the 2 resistors 102a and 102b is decreased. Accordingly, if the controller 230 evaluates a voltage level based on the over current detection signal OC#1 and determines that the evaluated voltage level is less than the predetermined value indicating the over current, the controller 230 informs a USB controller of an occurrence of the over current to shut off the USB interface at the connector unit 220.

Additionally, the protection circuit 100 further comprises a decoupling capacitor 101 comprising 2 capacitors 101a and 101b to shut an alternating current component as noise. However, it is to be understood that the circuit 100 need not include both the decoupling capacitor 101 and the over current protection circuit 102

If the over current comes from the external USB device 300, the protection circuit 100 further comprises an FET 104 to flow the over current into the ground GND. A drain D of the FET 104 is connected to an input terminal +5V dual receiving the power from the power supplying unit 210 and a source S of the FET 104 is connected to the ground GND. Additionally, a gate G of the FET 104 receives the control signal from the controller 230. The controller 230 of the present embodiment transfers the signal S5_state indicating a state of shutting off the power of the USB circuit device 200 to the gate G of the FET 104 due to the over current.

If the USB circuit device 200 is in the S5 state of shutting off the power, the signal S5_state indicating the state of shutting off the power has a logical state "1". In this case, the FET 104 is turned-on and the output terminal SVCC1 and the ground GND are short circuited. Accordingly, although the external USB device 300 has the own power source and then the over current is induced into the USB circuit device 200 having a low voltage, the USB circuit device 200 is protected because the over current is induced into the ground GND and is not induced into the USB circuit device 200.

Furthermore, the protection circuit 100 further comprises a fuse 103 to protect the circuit from the over current. The fuse 103 has a property that impedance is increased while the over current is occurring. According to the property of the fuse 103 that impedance is increased, the fuse 103 is opened and the over current is shut off if the over current is induced into the fuse 103. Particularly, in case that the power of the USB circuit device 200 is shut off in the S5 state and the FET 104 is turned-on so that the output terminal SVCC1 and the ground GND are short circuited, if the over current from the external USB device 300 is induced into the USB circuit device 200, the fuse 103 is opened due to the instant over current and then the input terminal +5V DUAL and the output terminal SVCC1 are electrically disconnected so that the circuit is more stable. Here, the fuse 103 is an example for an over current shutting unit. However, it is to be understood that the fuse 103 is not required in all aspects and can be otherwise constructed.

In other words, according to an aspect of the present invention, an FET is added to the conventional USB protection circuit, and the circuit may be protected from the over current of the external device without an additional voltage loss (or the voltage drop) not satisfying the USB specification.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A USB circuit device comprising:
    a connector unit to which an external USB device is connected;
    a power supplying unit that supplies power to the external USB device through the connector unit;
    a switching unit that selectively flows current induced into the connector unit from the external USB device to a ground; and
    a controller that controls the switching unit to flow the current induced into the connector unit to the ground if a level of the power provided to the external USB device by the power supplying unit is less than a predetermined value.

2. The USB circuit device according to claim 1, further comprising at least one internal device that receives power, wherein the controller determines that the level of the power provided to the external USB device is less than the predetermined value if the internal device is in a state of shutting off its power.

3. The USB circuit device according to claim 2, wherein the USB circuit device is in an S5 state based on the Advanced Configuration and Power Interface (ACPI) specification if the internal device is in a state of shutting off the power.

4. The USB circuit device according to claim 3, wherein the power supplying unit outputs a 5V normal power in an S0 state and a 5V stand-by power in an S3 state.

5. The USB circuit device according to claim 1, wherein the switching unit includes a field effect transistor (FET).

6. The USB circuit device according to claim 5, wherein the FET includes a drain connected to an output terminal of the power supplying unit, a source connected to the ground, and a gate connected to the controller.

7. The USB circuit device according to claim 5, wherein the gate receives a control signal from the controller such that the FET selectively flows the current into the ground.

8. The USB circuit device according to claim 1, further comprising:
    an over current shutting unit that shuts off the flow of the current induced into the connector unit from the external USB device, if the current induced into the connector unit from the external USB device is more than a predetermined value.

9. The USB circuit device of claim 8, wherein the over current shutting unit comprises a fuse that opens when the current induced into the connector unit from the external USB device is more than the predetermined value.

10. The USB circuit device according to claim 1, further comprising:
    an over current protection circuit that transfers an over current detection signal to the controller if an output terminal at the external USB device is short-circuited from the ground, and
    a USB controller that controls the USB interface with the external USB device,
    wherein the controller controls the USB controller to shut off the USB interface according to the over current detection signal based on the over current detection signal.

11. The USB circuit device according to claim 1, wherein the over current protection circuit comprises two resistors having a connection point and wherein the over current detection signal indicates the voltage of the connection point.

12. The USB circuit device of claim 1, further comprising:
    a decoupling capacitor that eliminates an alternating current component of the current flowing to the external USB device.

* * * * *